Aug. 25, 1931.     C. E. NORRIS     1,820,478
TIRE REPAIR VULCANIZER
Filed May 2, 1930     4 Sheets-Sheet 1

INVENTOR
CHARLES E. NORRIS
BY
ATTORNEYS

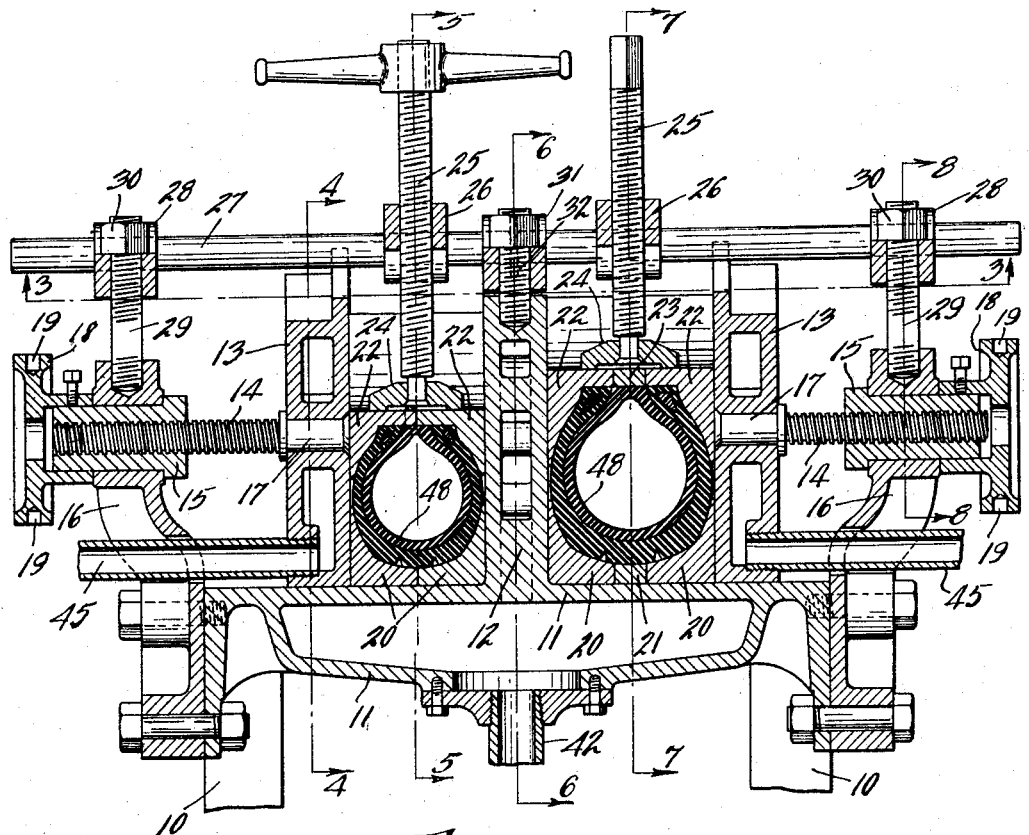
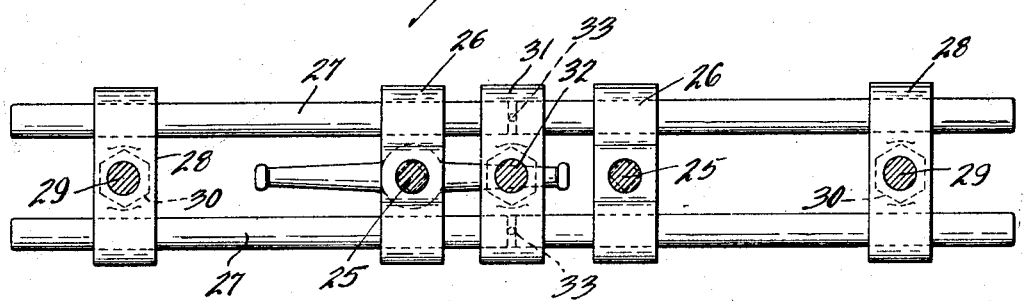

Aug. 25, 1931.  C. E. NORRIS  1,820,478
TIRE REPAIR VULCANIZER
Filed May 2, 1930  4 Sheets-Sheet 3

INVENTOR
CHARLES E. NORRIS
By Ely & Barrow
ATTORNEYS

Aug. 25, 1931.  C. E. NORRIS  1,820,478
TIRE REPAIR VULCANIZER
Filed May 2, 1930  4 Sheets-Sheet 4

INVENTOR
CHARLES E. NORRIS

BY Ely & Barrow

ATTORNEYS

Patented Aug. 25, 1931

1,820,478

UNITED STATES PATENT OFFICE

CHARLES E. NORRIS, OF LONDON, ONTARIO, CANADA, ASSIGNOR TO THE SUMMIT MOLD AND MACHINE COMPANY, OF AKRON, OHIO, A CORPORATION OF OHIO

TIRE REPAIR VULCANIZER

Application filed May 2, 1930. Serial No. 449,126.

This invention relates to tire repair vulcanizers.

One purpose of the invention is to provide an improved tire repair vulcanizer which is readily and accurately adjustable to any combination of tire width and tire circle within a wide range of tire sizes.

A further purpose of the invention is to provide an improved duplex vulcanizer of the above-described characteristics which is capable of being so adjusted that both molds may be kept in continuous use regardless of the order in which the tires are received at the unit to be cured, that is a tire can be removed from either mold and replaced by another tire regardless of size, without disturbing a tire in the other mold.

The foregoing and other purposes of the invention are attained in the repair vulcanizer shown in the accompanying drawings and described below. It is to be understood that the invention is not limited to the specific form thereof shown and described.

Of the accompanying drawings,

Figure 2 is a longitudinal vertical section therethrough;

Figure 3 is a section along line 3—3 of Figure 2;

Figure 1:
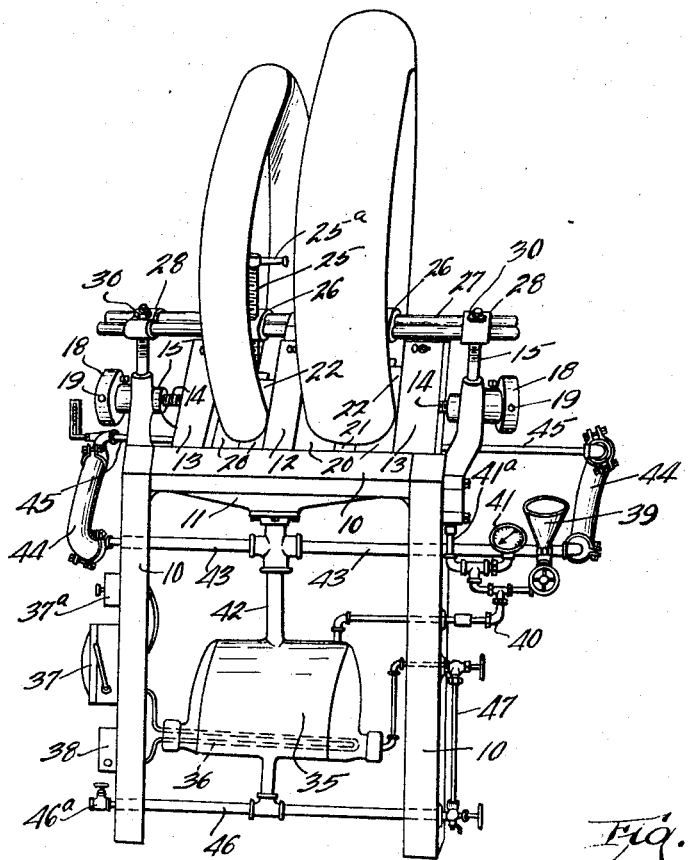
Figure 1 is a perspective front elevation of a vulcanizer embodying the invention.
Figure 4:
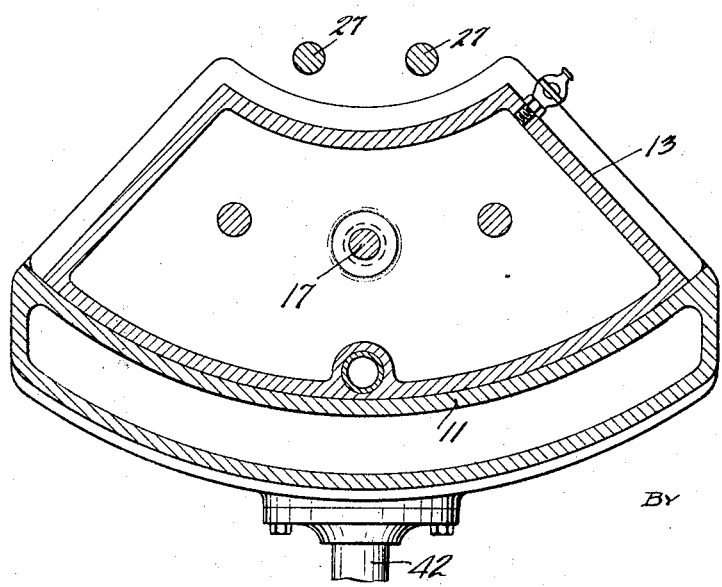
Figure 4 is a section along line 4—4 of Figure 2.

Referring to the drawings, the numeral 10 designates a suitable frame on which is supported an arcuate jacketed base 11 formed with a jacketed central wall 12. Two floating side wall members 13, 13, also jacketed, are arranged to be moved over base 11 toward and from said central wall. The central wall and the two side wall members are of arcuate formation as shown corresponding to the arcuate formation of tires to be cured therein as to the major circumferences of the tires, the sides of said walls, however, being flat.

To move the side wall members 13 toward or from the central wall member 12, screws 14, 14 may be provided, these being threaded through bushings, 15, 15 journaled in brackets 16, 16 mounted on frame 10 and being journaled at 17, 17 in the side wall members 13. The bushings 15 have wheels 18, 18 secured thereto for rotating the same, these wheels being preferably formed with sockets 19 to receive a lever bar (not shown) for turning the same to apply the required pressure on the molds.

Figure 5:
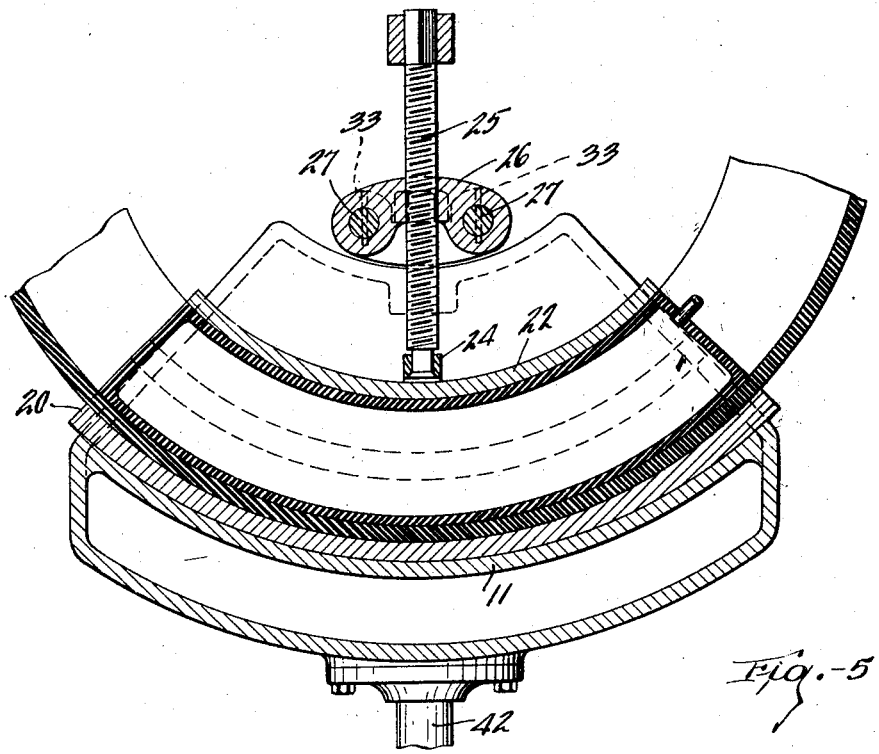
Figure 5 is a section along line 5—5 of Figure 2.
Figure 6:
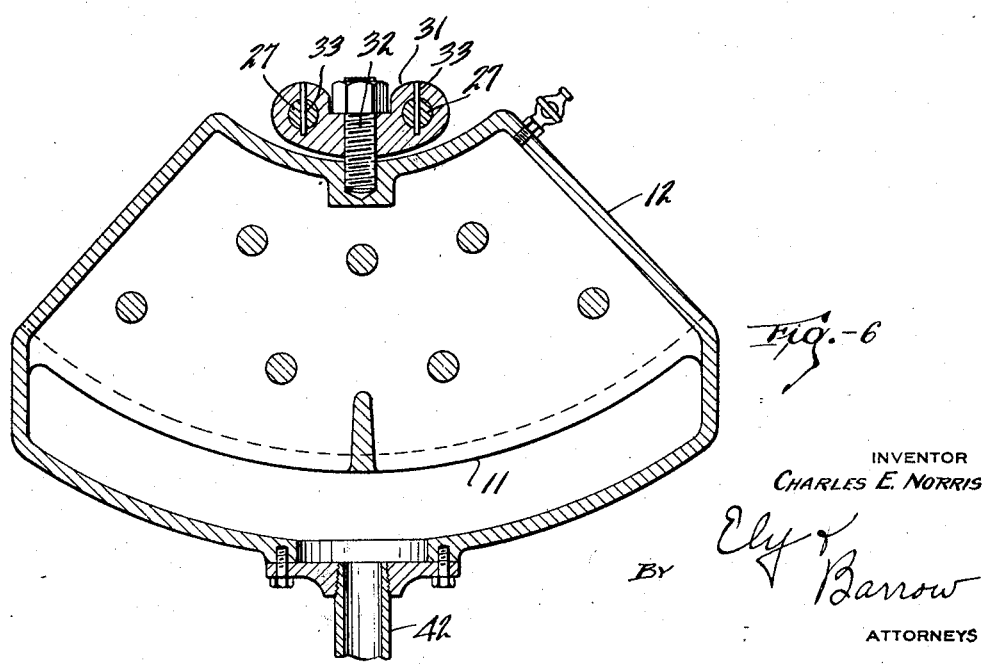
Figure 6 is a section along line 6—6 of Figure 2.
Figure 7:
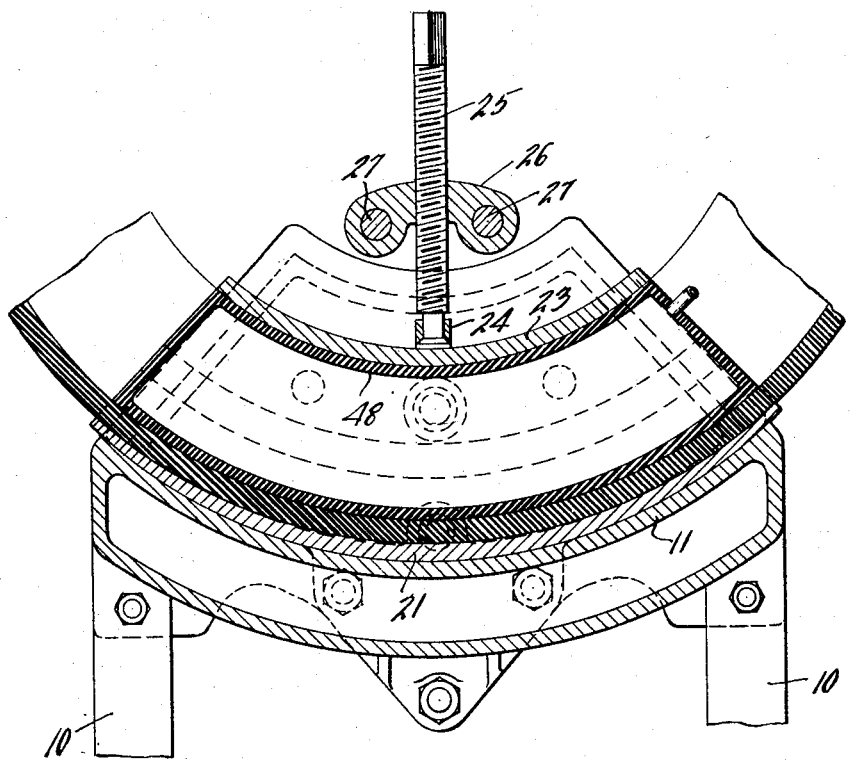
Figure 7 is a section along line 7—7 of Figure 2.
Figure 8:
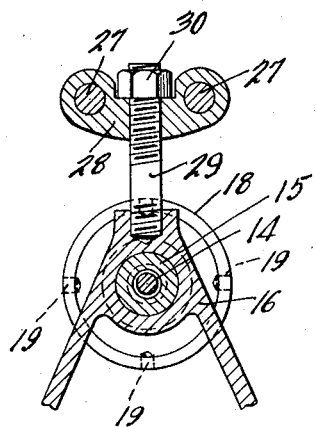
Figure 8 is a section along line 8—8 of Figure 2.

The molds include pairs of arcuate mating tread plates 20, 20 fitted between the central and side walls. These plates are all formed with an outer circumference fitted to the curvature of base 11 and with an inner circumference corresponding to a size or small range of sizes of the tires for which the tread plates are used (see Fig. 5), it being understood that a number of pairs of tread plates 20 having substantially the sectional contour of the tires to be cured are provided to accommodate the entire range of sizes to which the equipment is adapted. As will be apparent the tread plate equipment may be adapted for tires of the same major diameter, but with varying minor diameters or tread width by the provision of filler plates 21 arranged between the pairs of plates 20, these also having outer circumferences fitted to the upper surface of base 11 and inner circumferences fitted more or less to tire curvatures.

The molds also include pairs of mating bead molding plates 22, 22, these being fitted to the sectional contour of the beat portions of the tires to be cured and a number of pairs thereof being provided to accommodate the range of tire sizes. With these plates, filler plates 23, 23 also may be used to adjust for different widths of tires of the same major circumferences.

The application of radial pressure to the molds is provided for by presser members 24 which may be adapted to be urged downwardly onto the bead molding plates 22 by screws 25 on the ends of which members 24 are journaled, the screws 25 being threaded through blocks 26 slidably adjustable along bars 27, 27 which in turn are slidably mounted in blocks 28. Blocks 28 are secured on posts 29 on which they may be threaded as shown whereby they are vertically adjustable, a nut 30 being provided to secure each block 28 in place. The bars are removably supported at their inner ends on the central wall 12 by provision of a block 31 thereon similar to blocks 28, the block 31 being threaded onto a stud 32 secured on wall 12 so as to be adjustable vertically also. Block 31 is provided with apertures designed to receive both sets of bars 27, pins 33 being arranged across the central portions of these apertures to limit inward movement of the bars 27 therein from the opposite sides of the block. Screws 25 may be formed to be operated by a removable handle 25ª. It will be apparent that the radial pressure applying apparatus as described above is entirely independent of the floating walls 13 so that there is no tendency for the internal pressure in a tire to exert stresses thereon which would be transferred to the screws 14.

The vulcanizer jackets 11, 12 and 13 are preferably heated by a fluid such as steam. To this end a boiler 35 may be mounted in frame 10 which may be equipped to be electrically heated by a unit 36 controlled by suitable devices which may include a main switch 37, secondary switch 37ª and a temperature controlled switch 38. Water may be supplied boiler 35 through funnel 39 connected in piping 40 on which piping a pressure gauge 41 and safety valve 41ª may be attached. The steam is distributed to the vulcanizer jackets by main line 42 connected to the base 11 and branches 43, 43 connected by flexible connections 44 to pipes 45, 45 for delivering steam to the floating wall members 13. A drain line 46 is provided for the boiler to which a by-pass water gauge 47 may be connected as shown, line 46 being controlled by a valve 46ª.

In use, the various molding parts are assembled in each mold as required to correspond to the tires to be vulcanized therein, the floating members 13 being adjusted away from the central wall 12, the bars 27 being slid back from over the molds and the pressure screws 25 being removed for this purpose. It will be apparent that these operations may be done with relation to one mold while not affecting continued vulcanization of a tire in the other mold. After the mold has been assembled about the tire and the enclosed sectional pressure bag 48 (Figure 2), the screws 25 are remounted on bars 27 and the screws 14 and 25 are actuated to apply pressure transversely and radially of the mold. The fluid pressure is supplied to bags 48 by suitable means (not shown) and the internal pressure is, of course, opposed by screws 14 and 25 which hold the mold parts in cooperative relation to the tire throughout the cure.

It will appear from the foregoing that a simple, flexible duplex tire repairing unit has been provided by the invention which includes features also capable of effective use in other equipment of this type. Accordingly it will be understood that modifications of the invention or the utilization of the above features thereof in other equipment may be resorted to without departing from the spirit thereof or the scope of the appended claims.

What is claimed is:—

1. A duplex tire vulcanizer comprising a base provided with a central wall, floating walls movable over said base toward and from opposite sides of the central wall whereby two molding spaces adjustable to the same range of width are provided, pairs of tread molding plates and bead molding plates receivable in said spaces, independent means for urging each floating wall toward the central wall to clamp said molding plates therebetween, and independent means for urging each pair of bead molding plates toward said base in each molding space, said last-named means comprising bars, pressure applying means slidable to adjusted positions along the bars, bracket means slidably mounting the bars independently of the floating wall members, and means on the central wall member for supporting the bars during application of pressure by said pressure applying means.

2. A duplex tire vulcanizer comprising a base provided with a central wall, floating walls movable over said base toward and from opposite sides of the central wall whereby two molding spaces adjustable to the same range of width are provided, pairs of tread molding plates and bead molding plates receivable in said spaces, independent means for urging each floating wall toward the central wall to clamp said molding plates therebetween, and independent means for urging each pair of bead molding plates toward said base in each molding space, the last-named means being supported independently of said floating walls.

3. A duplex tire vulcanizer comprising a base provided with a central wall, floating walls movable over said base toward and from opposite sides of the central wall whereby two molding spaces are provided, a pair of bead molding plates receivable in said spaces, independent means for urging each floating wall toward the central wall against said bead molding plates, and independent means for urging each pair of bead molding plates toward said base in each molding space, said last-named means being supported independently of said floating walls.

4. A tire vulcanizer of the type described comprising a base having a relatively fixed member and a floating member thereon to define a molding space, mold parts receivable in said space, means for urging the floating member over the base toward the fixed member to clamp said parts therein, and means for exerting radial pressure on said mold parts, said means including a support beyond the floating member, an element spanning said support and said fixed member and pressure applying means slidably adjustable on said element to apply radial pressure where required to said mold parts independently of said floating member.

5. A tire vulcanizer of the type described comprising a base having a relatively fixed member and a floating member thereon to define a molding space, mold parts receivable in said space, means for urging the floating member over the base toward the fixed member to clamp said parts therein, and means for exerting radial pressure on said mold parts, said means including a support beyond the floating member, an element spanning said support and said fixed member and pressure applying means on said element to apply radial pressure to said mold parts independently of said floating member.

CHARLES E. NORRIS.